United States Patent
Kasher et al.

(10) Patent No.: US 10,681,649 B2
(45) Date of Patent: Jun. 9, 2020

(54) DYNAMIC SPATIAL REUSE IN DISTRIBUTION NETWORKS

(71) Applicant: QUALCOMM Incorporated, San Diego, CA (US)

(72) Inventors: Assaf Yaakov Kasher, Haifa (IL); Amichai Sanderovich, Atlit (IL); Alecsander Petru Eitan, Haifa (IL); Solomon Trainin, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/268,056

(22) Filed: Feb. 5, 2019

(65) Prior Publication Data

US 2019/0261283 A1    Aug. 22, 2019

Related U.S. Application Data

(60) Provisional application No. 62/632,405, filed on Feb. 19, 2018.

(51) Int. Cl.
| | |
|---|---|
| *H04W 52/24* | (2009.01) |
| *H04W 72/04* | (2009.01) |
| *H04L 5/14* | (2006.01) |
| *H04W 74/08* | (2009.01) |
| *H04W 84/12* | (2009.01) |

(52) U.S. Cl.
CPC ............ *H04W 52/243* (2013.01); *H04L 5/14* (2013.01); *H04W 72/0446* (2013.01); *H04W 74/0816* (2013.01); *H04W 84/12* (2013.01)

(58) Field of Classification Search
CPC .............. H04W 52/24; H04W 52/243; H04W 72/0446; H04W 74/0816; H04W 84/12; H04L 5/14

USPC .......... 455/522, 69, 415, 450; 370/213, 252, 370/336, 337, 329, 315, 445
See application file for complete search history.

(56) References Cited

U.S. PATENT DOCUMENTS

| | | | | |
|---|---|---|---|---|
| 5,982,742 | A * | 11/1999 | Leung | H04B 7/2612 370/213 |
| 6,393,007 | B1 * | 5/2002 | Haartsen | H04J 3/1682 370/337 |
| 8,335,167 | B1 | 12/2012 | Zhang et al. | |
| 2002/0154653 | A1 * | 10/2002 | Benveniste | H04L 12/4013 370/447 |
| 2002/0159395 | A1 * | 10/2002 | Nelson, Jr. | H04W 52/24 370/252 |
| 2005/0058151 | A1 * | 3/2005 | Yeh | H04W 52/46 370/445 |

(Continued)

FOREIGN PATENT DOCUMENTS

WO    2016195442 A1    12/2016

OTHER PUBLICATIONS

International Search Report and Written Opinion—PCT/US2019/016903—ISA/EPO—dated May 6, 2019.

(Continued)

*Primary Examiner* — Tan H Trinh
(74) *Attorney, Agent, or Firm* — Steven R. Theil; Patterson & Sheridan LLP

(57) ABSTRACT

Certain aspects of the present disclosure provide methods and apparatus for spatial reuse for neighboring nodes of distribution networks, so they may transmit without causing interference to nodes of the distribution network.

13 Claims, 12 Drawing Sheets

(56) References Cited

U.S. PATENT DOCUMENTS

| | | | | |
|---|---|---|---|---|
| 2006/0268797 A1* | 11/2006 | Cheng | | H04W 74/0816 370/338 |
| 2008/0144493 A1* | 6/2008 | Yeh | | H04W 52/50 370/230 |
| 2010/0278198 A1* | 11/2010 | Tirkkonen | | H04W 56/002 370/503 |
| 2011/0206020 A1* | 8/2011 | Hollick | | H04W 72/005 370/337 |
| 2011/0305188 A1* | 12/2011 | Bouwers | | H04W 76/45 370/315 |
| 2012/0099450 A1* | 4/2012 | Madan | | H04W 74/0816 370/252 |
| 2014/0226575 A1* | 8/2014 | Davydov | | H04W 52/04 370/329 |
| 2014/0313932 A1* | 10/2014 | Saltsidis | | H04L 41/082 370/254 |
| 2015/0189647 A1* | 7/2015 | Poggi | | H04J 3/0644 370/336 |
| 2016/0242056 A1* | 8/2016 | Patil | | H04W 76/14 |
| 2016/0262102 A1* | 9/2016 | Sakata | | H04B 7/15542 |
| 2018/0069623 A1* | 3/2018 | Armoni | | H04B 7/2643 |
| 2018/0227952 A1 | 8/2018 | Kim et al. | | |
| 2018/0269925 A1* | 9/2018 | Matsuo | | H02J 7/025 |
| 2018/0317197 A1* | 11/2018 | Kasher | | H04W 64/006 |
| 2019/0037397 A1* | 1/2019 | Trainin | | H04W 4/08 |
| 2019/0045520 A1* | 2/2019 | Venkatachalam Jayaraman | | H04W 72/121 |
| 2019/0229882 A1* | 7/2019 | Trainin | | H04L 5/16 |
| 2019/0252919 A1* | 8/2019 | Ogawa | | H02J 7/025 |
| 2019/0268776 A1* | 8/2019 | Eitan | | H04L 1/0003 |
| 2019/0280532 A1* | 9/2019 | Matsuo | | H02J 50/40 |

OTHER PUBLICATIONS

Ulukan E., et al., "Angular MAC: a Framework for Directional Antennas in Wireless Mesh Networks", Wireless Networks; The Journal of Mobile Communication, Computation and Information, Kluwer Academic Publishers, DO, vol. 14. No. 2, Jul. 13, 2007, pp. 259-275, XP019582175, ISSN: 1572-8196.

* cited by examiner

DYNAMIC SPATIAL REUSE IN DISTRIBUTION NETWORKS

CROSS-REFERENCE TO RELATED APPLICATION & PRIORITY CLAIM

The present Application for patent claims priority to U.S. Provisional Application No. 62/632,405, filed Feb. 19, 2018, which is assigned to the assignee of the present application and hereby expressly incorporated by reference herein in its entirety.

INTRODUCTION

Field

Certain aspects of the present disclosure generally relate to wireless communications and, more particularly, to reducing interference in distribution networks that utilize point-to-point communication between devices.

BACKGROUND

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate at least one frame including information designed to enable one or more neighboring wireless nodes that are not part of a distribution network to communicate during one or more time slots assigned to the apparatus for simplex communications in the distribution network and an interface configured to output the frame for transmission during the one or more time slots.

Certain aspects of the present disclosure provide an apparatus for wireless communications. The apparatus generally includes a first interface configured to obtain at least one first frame from a first wireless node that belongs to a distribution network, a processing system configured to decide, based on information in the frame, that the apparatus is allowed to output frames for transmission during one or more time slots assigned to the first wireless node for reception of simplex communications in the distribution network and to generate at least one second frame and a second interface configured to output the second frame for transmission, during at least one of the one or more time slots, to a second wireless node that is not a member of the distribution network.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
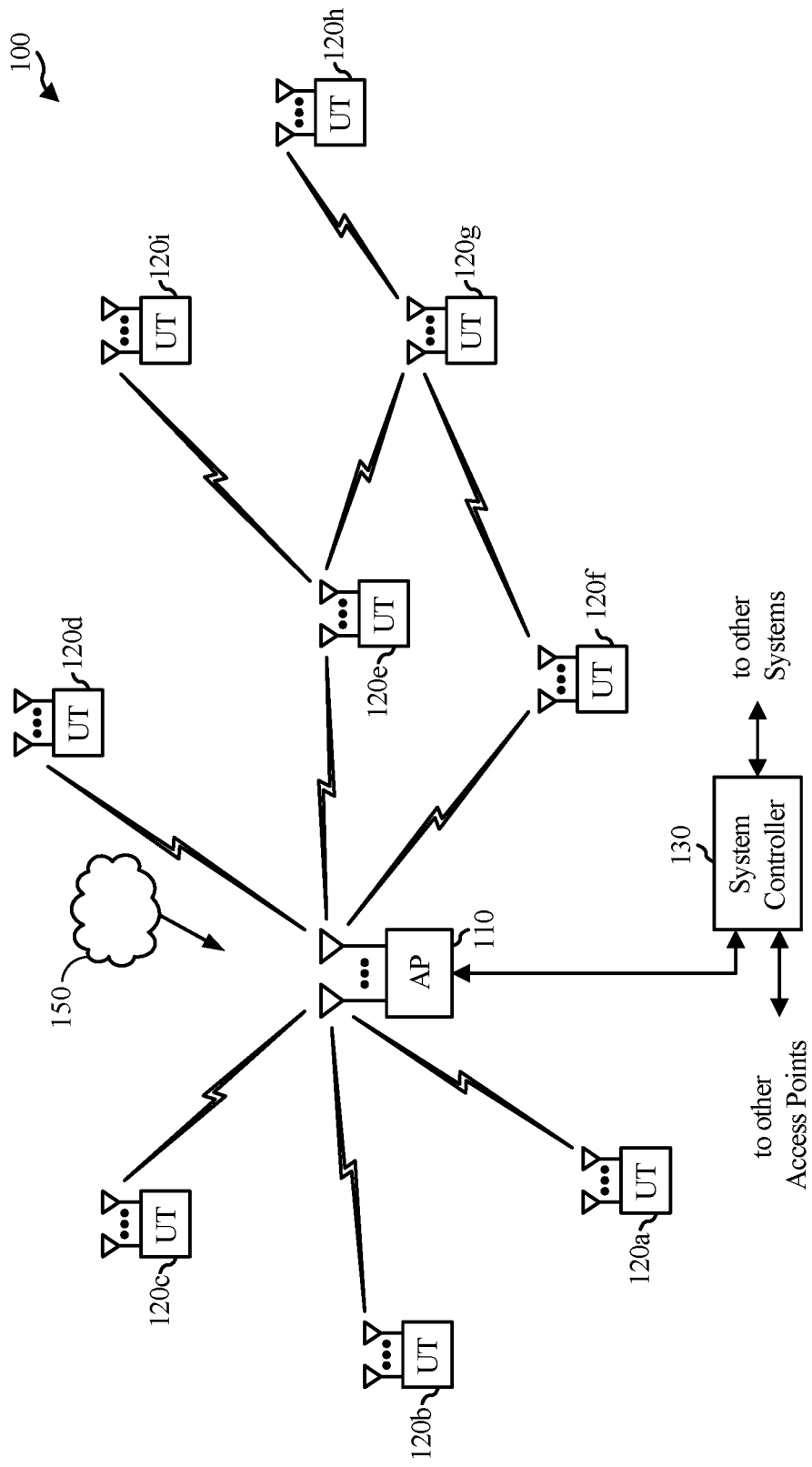
FIG. 1 is a diagram of an example wireless communications network, in accordance with certain aspects of the present disclosure.

Certain aspects of the present disclosure provide methods and apparatus for dynamic spatial reuse to manage interference in a distribution network (DN). As will be described herein, devices in a DN may convey information that may allow neighboring devices to simultaneously transmit, during TDD time slots allocated to devices of the DN, without interfering with those devices.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ES S"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
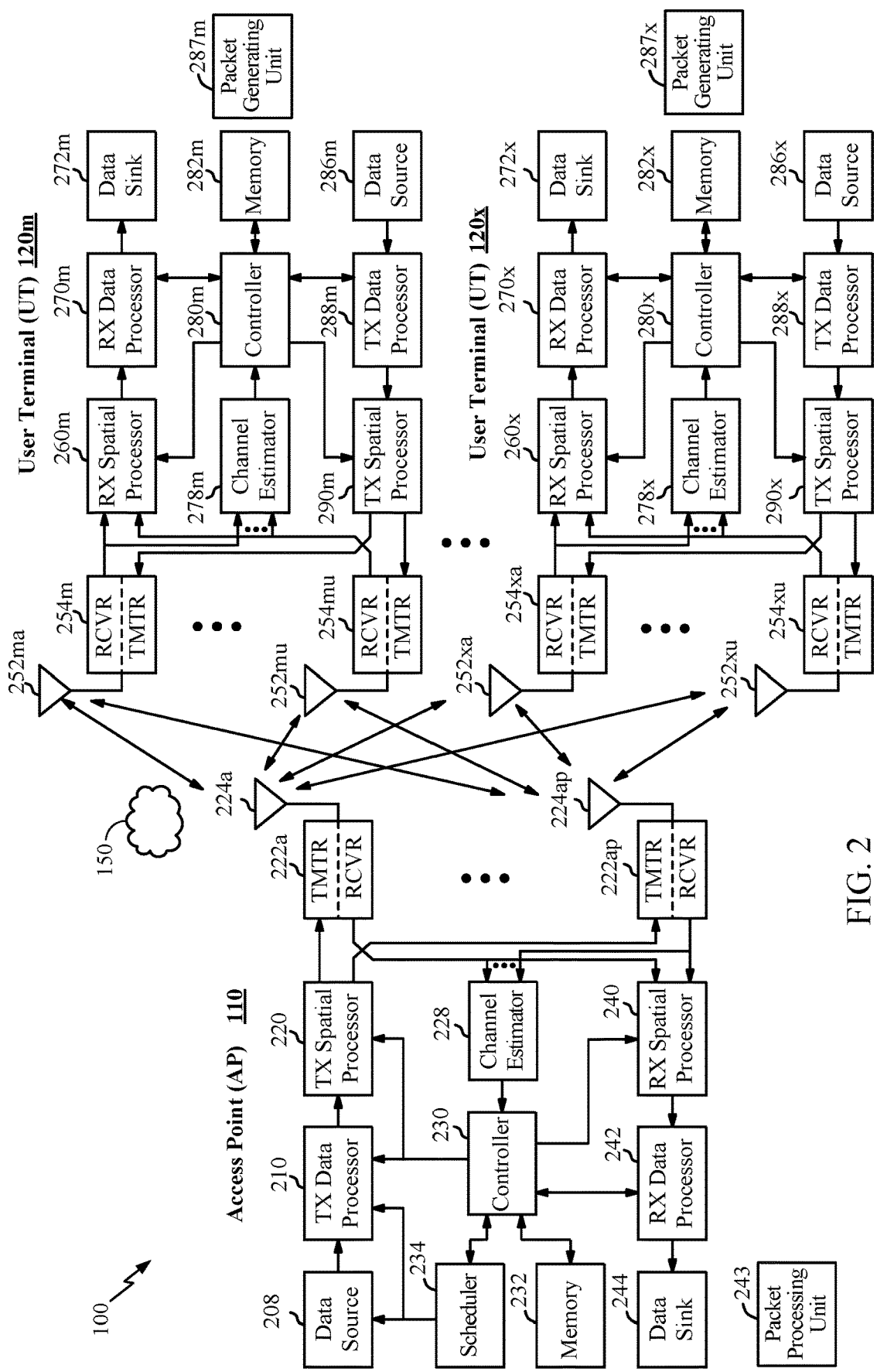
FIG. 2 is a block diagram of an example access point and example user terminals, in accordance with certain aspects of the present disclosure.

FIG. 2 illustrates a block diagram of access point 110 and two user terminals 120m and 120x in MIMO system 100.

The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more packets 150, with a preamble format as described herein (e.g., in accordance with one of the example formats shown in FIGS. 3A-3B), to the access point 110, for example. Each packet 150 may be transmitted on a set of one or more spatial streams (e.g., up to 4). For certain aspects, the preamble portion of the packet 150 may include tone-interleaved LTFs, subband-based LTFs, or hybrid LTFs (e.g., in accordance with one of the example implementations illustrated in FIGS. 10-13, 15, and 16).

The packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a packet 150 based on the IEEE 802.11 standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
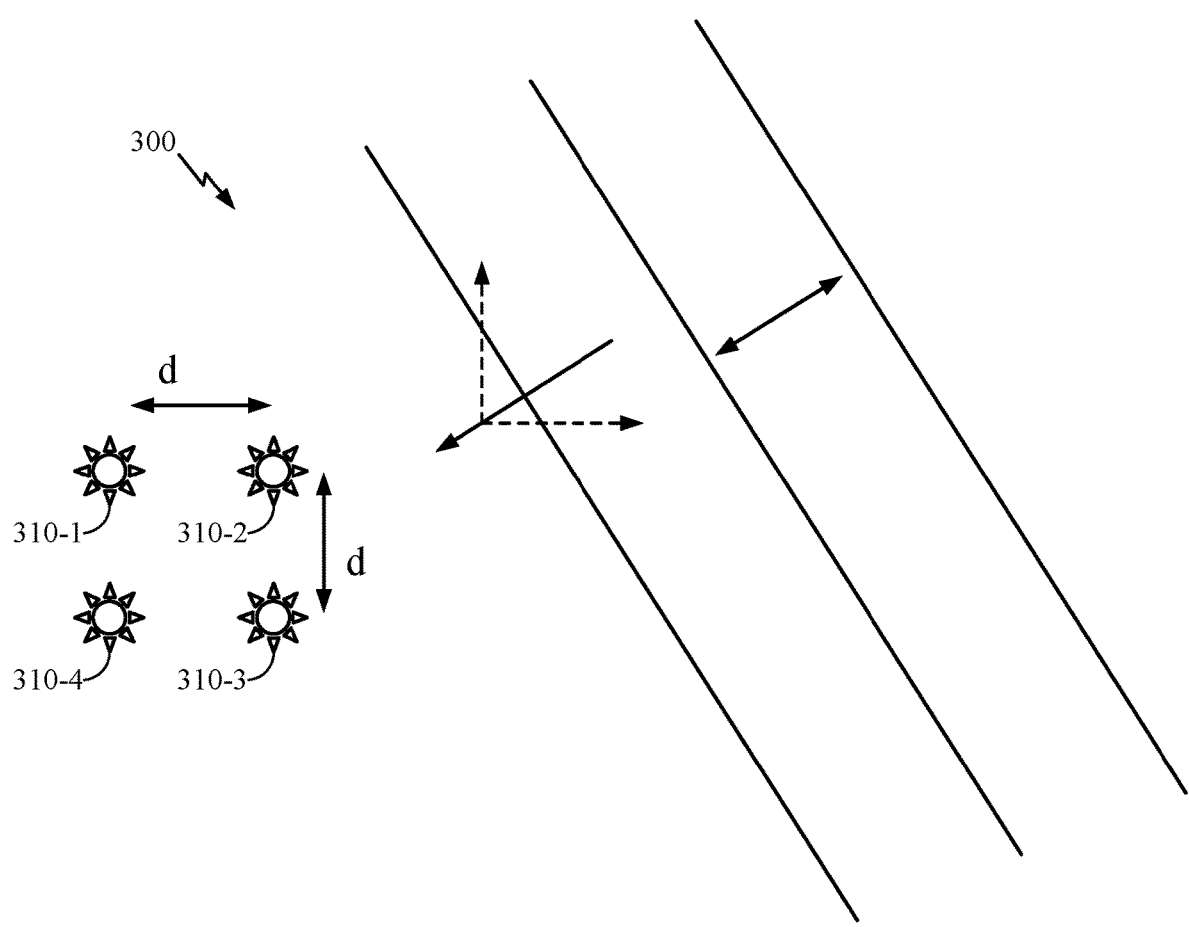
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

In high frequency (e.g., mmWave) communication systems like 60 GHz (e.g., 802.11ad and 802.11ay), communication is based on beamforming (BF), using phased arrays on both sides for achieving good link. As described above, beamforming (BF) generally refers to a mechanism used by a pair of STAs to adjust transmit and/or receive antenna settings achieve desired link budget for subsequent communication.

Example of Distribution Network

Aspects of the present disclosure provide techniques for providing secure network and association services to allow a device to join a distribution network (DN). The techniques may also provide information used to communicate in the distribution network, such as scheduling and clock offset information.

The techniques presented herein may allow for the implementation of DNs in the 60 GHz spectrum. Such implementations may include features such as, for example, scheduled access to mitigate interference. Such scheduled access may be provided by allocating service periods in which devices communicate via simplex communication. As used herein, the term service period (SP) generally refers to a period a station is awake and capable of receiving or transmitting frames. Simplex communication generally refers to communications via a channel that sends information in one direction only (as opposed to full-duplex communication in which two entities can communicate with each other simultaneously or half-duplex communication in which each entity can communicate with the other but not simultaneously).

Aspects of the present disclosure may provide DN support, for example, in a system in-line with an 802.11 standard for 60 GHz spectrum that currently lacks any such feature. Aspects of the present disclosure may provide secure network association services to a device seeking to join a DN and subsequent allocation of SPs to communicate between nodes in the DN to eliminate interference (e.g., using simplex communication).

Figure 4:
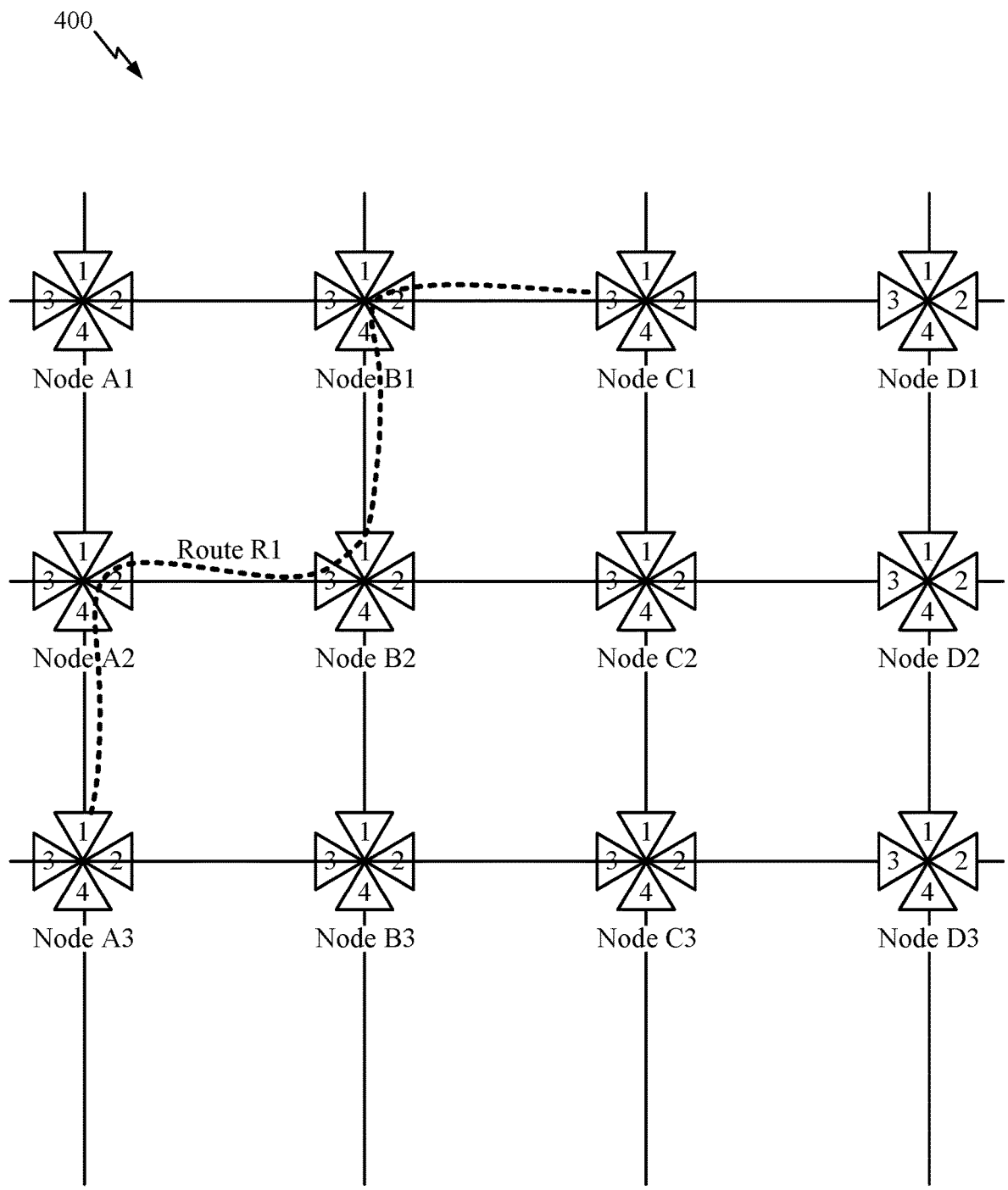
FIG. 4 illustrates an example of a distributed network in which aspects of the present disclosure may be practiced.

As illustrated in FIG. 4, a DN 400 may be formed by DN nodes that each contain one or more non-AP STAs. The DN nodes may communicate using point-to-point (e.g., 802.11ad) links between stations (STAs), with routing functions may be provided by protocols above an LLC level.

In the example illustrated in FIG. 4, DN 400 includes Nodes A1-D3, with each node include multiple stations. The stations may be oriented to optimize communications in a given direction, with the group of stations providing collective "omnidirectional" coverage. In DN 400, each node contains 4 stations STA1, STA2, STA3, and STA4. The STAs may have physical or virtual instantiation (meaning the STAs may have separate hardware components and physical resources or they may share resources as virtual STAs). Each STA may have its own MAC address locally or globally administered (and the routing functionality may be provided by mapping IP addresses to MAC addresses).

As illustrated, in some cases, only one STA of each Node may be used to connect to any one other Node. For example, STA3 of Node A1 is used to connect to STA3 of Node B1, while STA4 of Node A1 is used to connect to STA1 of Node A2. STAs not connected to another node may act as an access point (e.g., providing secure network association services to joining nodes, as described below).

In some cases, a route that communicates between two end Nodes may be devices to cross as few other Nodes in the DN 400. For example, as shown, a Route R1 may be provided that crosses Nodes A2, B2, B1 to communicate Node A3 with Node C1. As noted above, each node may provide layer 3 routing to communicate between end points. DN timing may be synchronized in any suitable manner, for example, via GPS or some other type of independent clock source.

Example Dynamic Spatial Reuse in Distribution Networks

Figure 9:
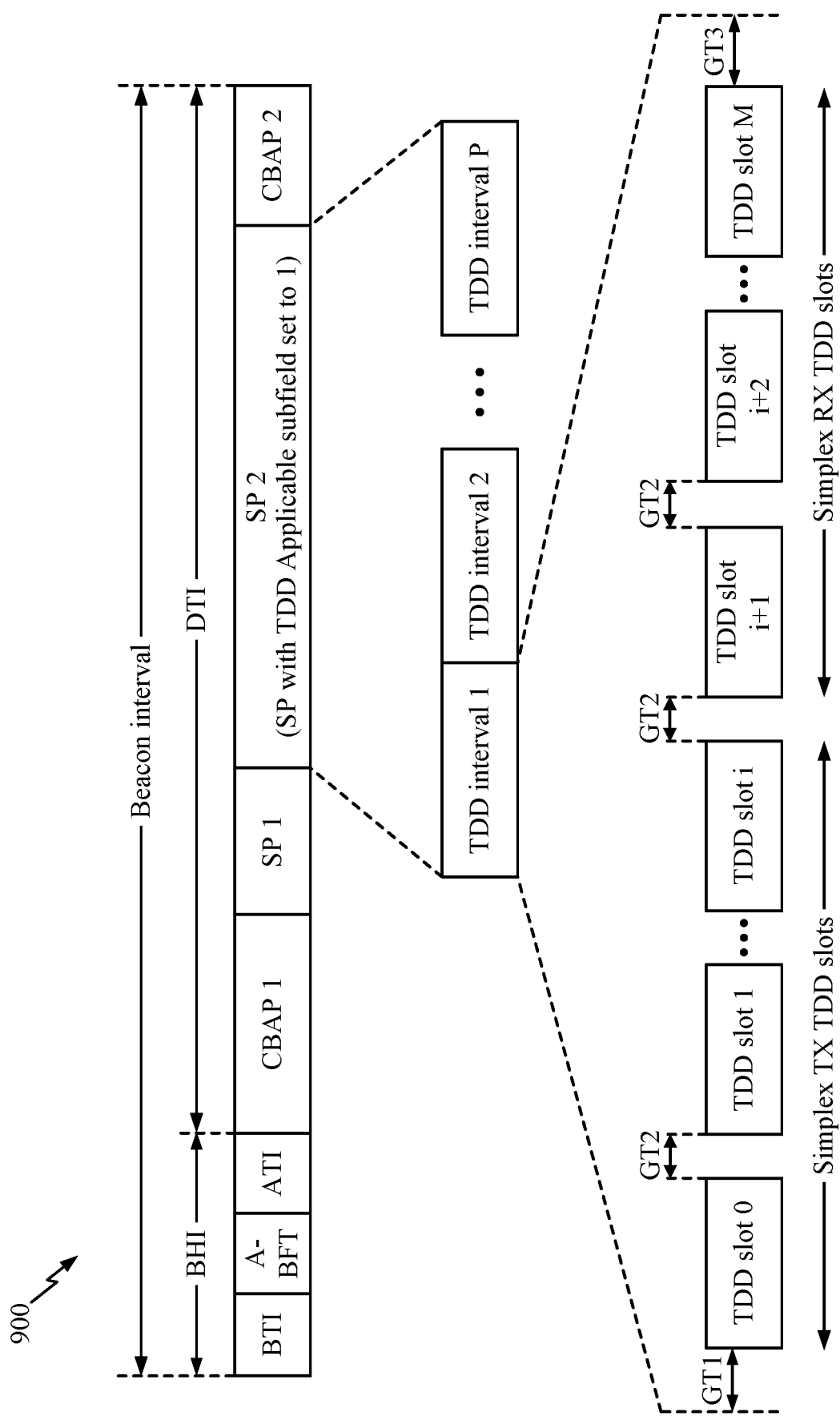
FIG. 9 illustrates an example of time division duplexed (TDD) scheduling in a distribution network.

Aspects of the present disclosure may provide an immediate response (e.g., acknowledgement) mechanism for devices in a Distribution (or Distributed) Network under time division multiple (TDM) access, in which each device is allocated time slots (time division duplexing or TDD slots as shown in FIG. 9) for communicating.

As used herein, communication generally refers to reception, transmission, or both. As described above, in a DN, time slots may be allocated for simplex communication between DN nodes, where one DN node is transmitting while the other DN node is receiving.

As described above, unlike normal WLAN channel access mechanisms, which are mostly based on the Listen-before-Talk principle, devices of a DN transmit on links in scheduled slots without checking whether the link is free. One application of such networks is for outdoor deployments, designed to use high gain antennas so that they create lower interference.

Figure 5:
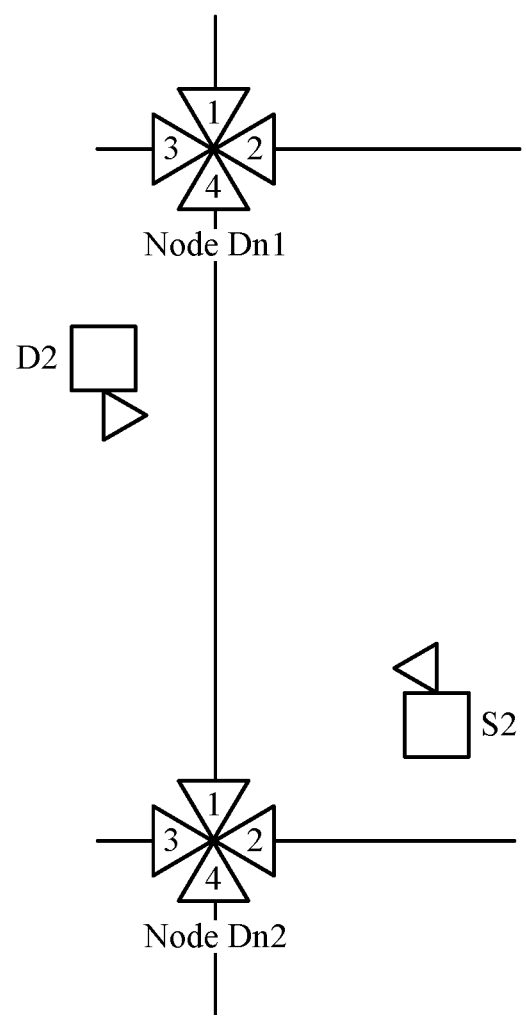
FIG. 5 illustrates an example distributed network topology in which aspects of the present disclosure may be practiced.

However, other "neighboring" devices also operating outdoor, close to the DN nodes, may not be able to access the medium because it is occupied continuously by the distribution network. For example, FIG. 5 illustrates an example deployment scenario in which neighboring devices S2 and D2 operate in close proximity to DN nodes DN1 and DN2. Nodes of the DN (e.g., DN1 and DN2) may be members of a basic service set (BSS), while neighboring devices (e.g., S2 and D2) are members of an overlapping BSS (OBSS). Using conventional channel access mechanisms, S2 and D2 may have trouble accessing the medium without interfering with communication between DN1 and DN2.

Aspects of the present disclosure, however, provide a mechanism that may allow neighboring devices to transmit in scheduled slots of a DN without interfering with the DN nodes allocated those slots. As will be described in further detail below, a node of the DN may transmit a frame with information that may enable other (neighboring) devices to transmit on slots when the DN node is in receive mode (e.g., based on a set of rules), without interfering with its reception, thus increasing the overall capacity of outdoor LANs co-exiting with distribution networks.

Figure 6:
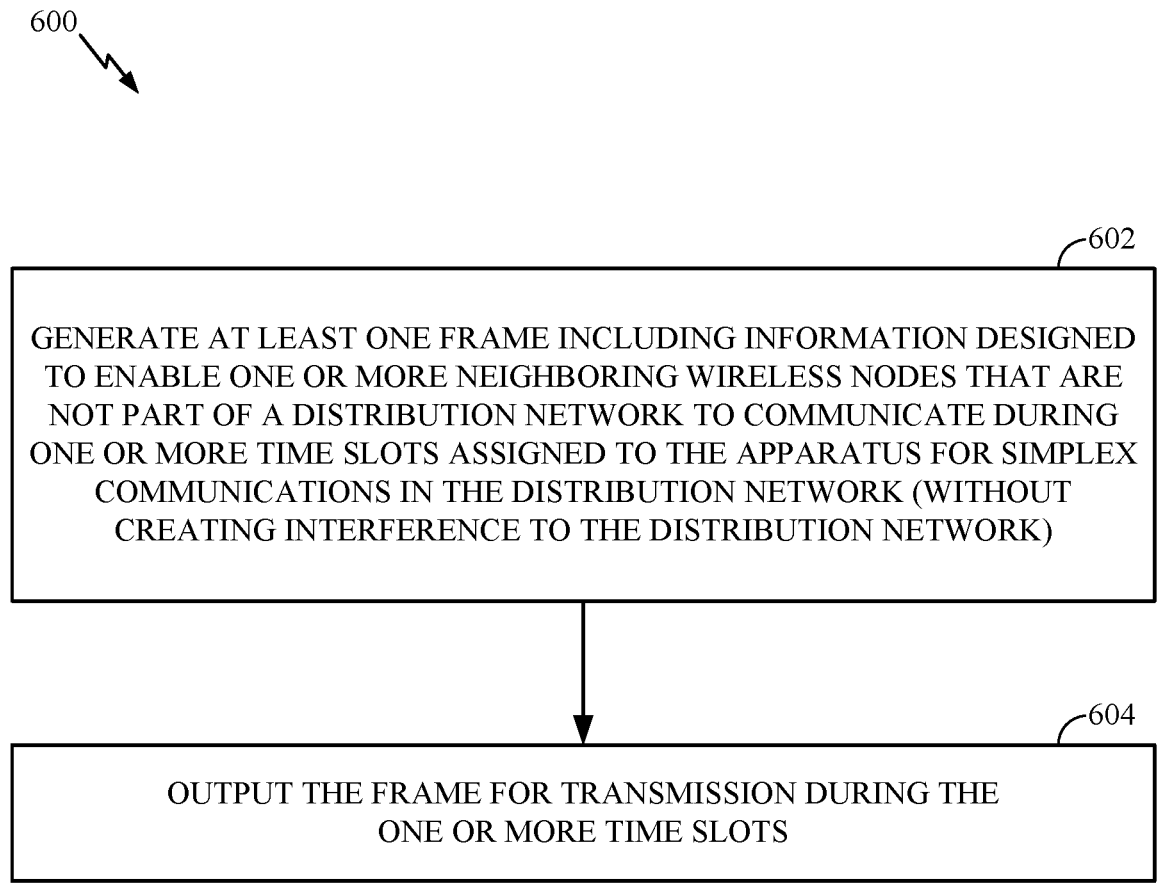
FIG. 6 illustrates an example of example operations for sending a frame with information to help allow neighboring devices avoid interference to devices in a distribution network, in accordance with certain aspects of the present disclosure.

FIG. 6 illustrates an example of example operations 600 for sending a frame with information to help allow neighboring devices avoid interference to devices in a distribution network, in accordance with certain aspects of the present disclosure. Operations 600 may be performed, for example, by a DN node (e.g., DN1 or DN2 shown in FIG. 5).

Operations 600 begin, at 602, by generating at least one frame including information designed to enable one or more neighboring wireless nodes that are not part of a distribution network to communicate during one or more time slots assigned to the apparatus for simplex communications in the distribution network (without creating interference to nodes of the DN). At 604, the DN node outputs the frame for transmission during the one or more time slots.

Figure 7:
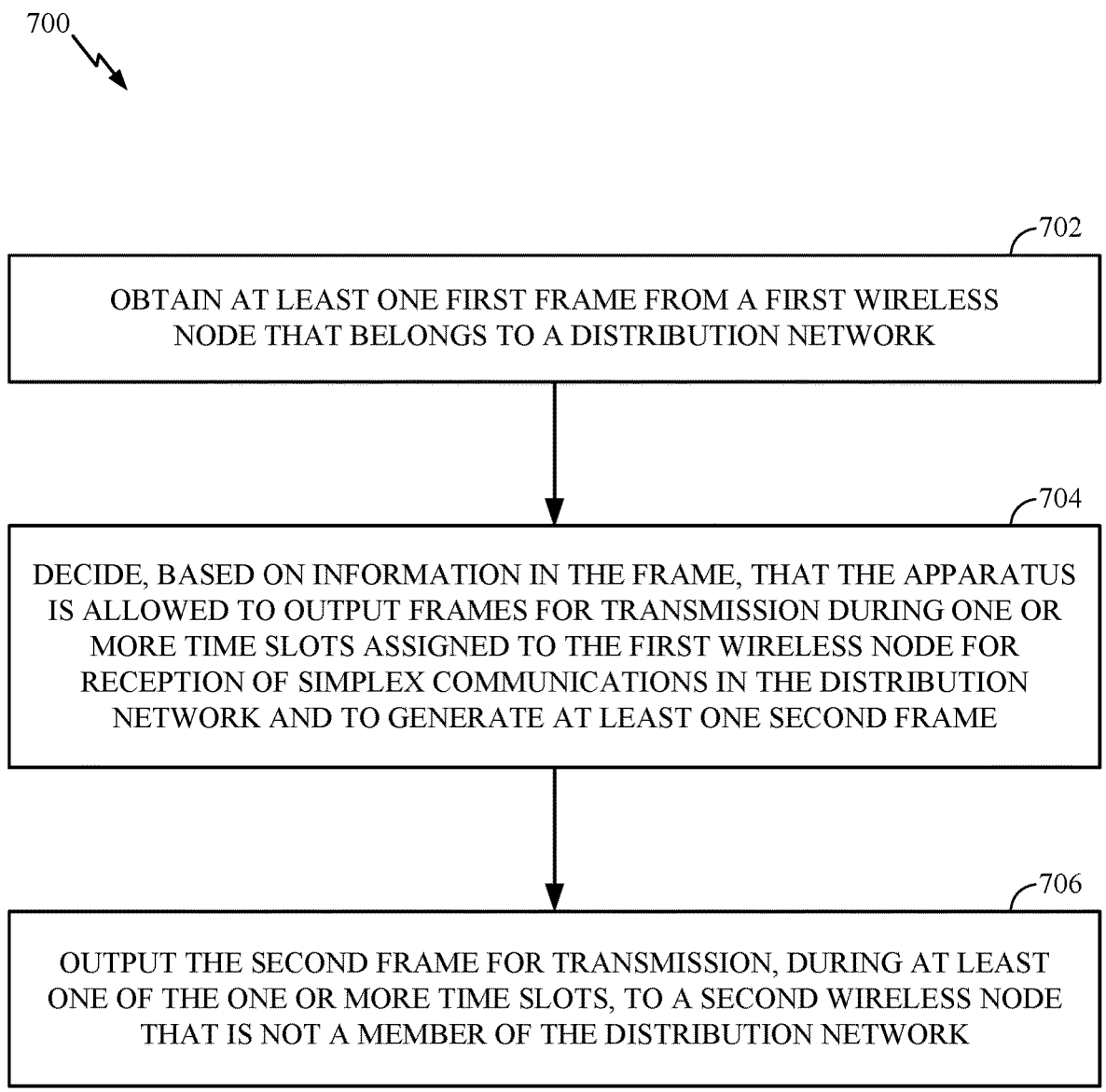
FIG. 7 illustrates an example of example operations for avoiding interference to devices in a distribution network, in accordance with certain aspects of the present disclosure.

FIG. 7 illustrates an example of example operations 700 for avoiding interference to devices in a distribution network, in accordance with certain aspects of the present disclosure. Operations 700 may be performed by a neighboring devices of a DN (e.g., by S2 or D2 shown in FIG. 5) performing operations 600.

Operations 700 begin, at 702, by obtaining at least one first frame from a first wireless node that belongs to a distribution network. At 704, the neighboring node decides, based on information in the frame, that the apparatus is allowed to output frames for transmission during one or more time slots assigned to the first wireless node for reception of simplex communications in the distribution network and to generate at least one second frame. At 706, the neighboring node outputs the second frame for transmission, during at least one of the one or more time slots, to a second wireless node that is not a member of the distribution network. In some cases, the neighboring node may generate one or more third frames including information regarding time slots assigned to the first wireless node for reception of simplex communications in the distribution network during which the apparatus can estimate potential interference caused to the first wireless node by (due to) outputting frames for transmission.

Figure 8:
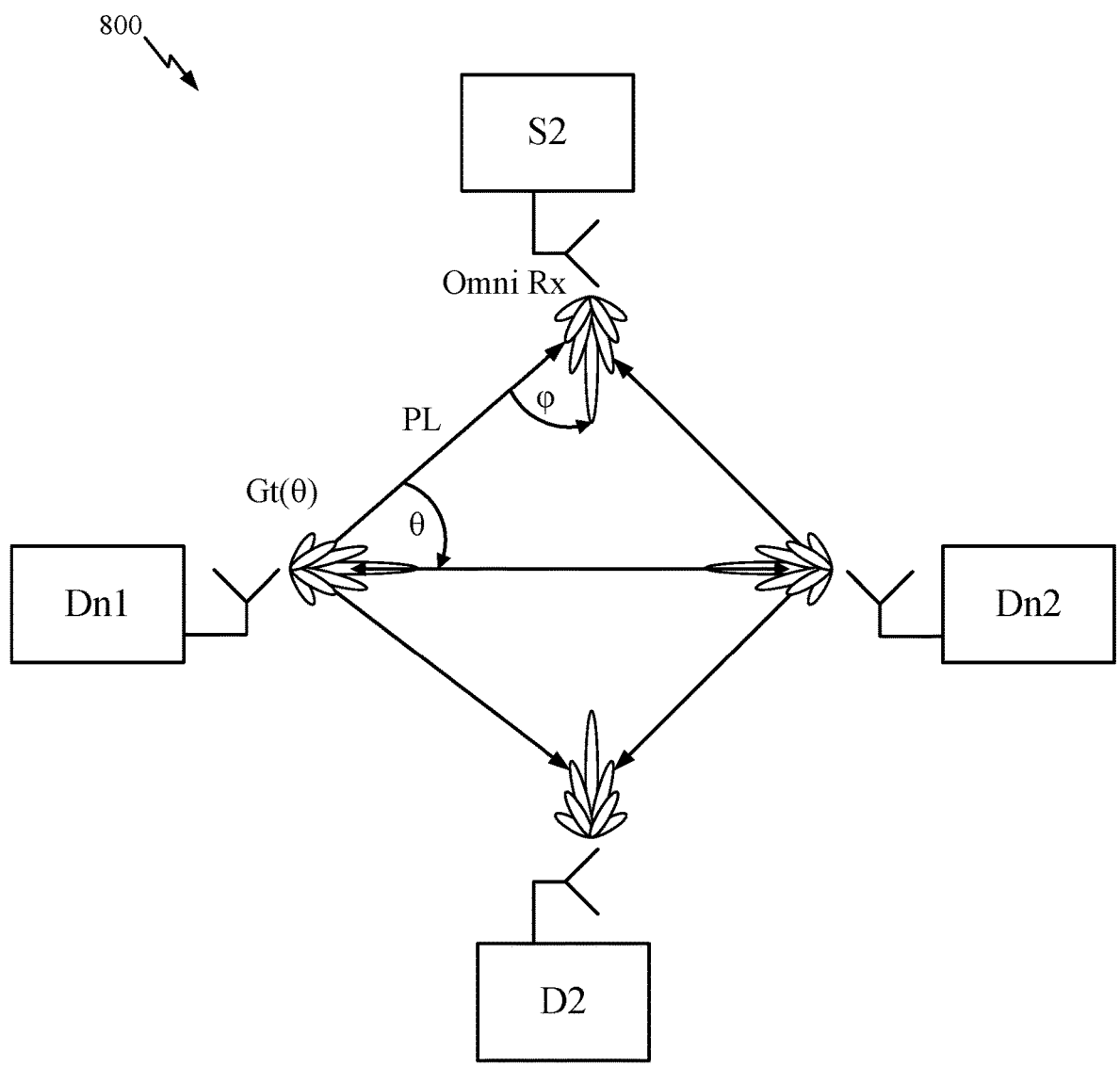
FIG. 8 illustrates an example scenario in which aspects of the present disclosure may be practiced.

The reuse mechanism presented herein may be described with reference to FIG. 8, which illustrates how transmissions between neighboring devices S2 and D2 may overlap with transmissions between DN nodes DN1 and DN2. As illustrated in FIG. 9, within a service period (SP), TDD slots may be allocated for simplex communication between pairs of DN nodes.

Figure 10A:
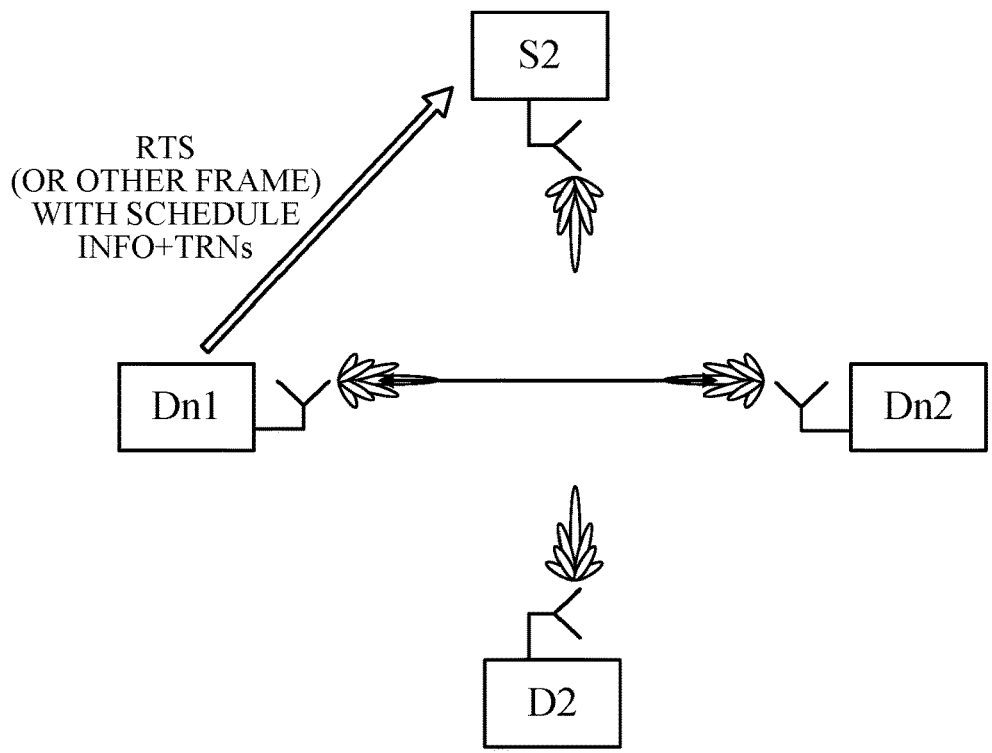
FIGS. 10A and 10B illustrate example phases for interference management in a distribution network, in accordance with certain aspects of the present disclosure.

During one of the time slots allocated to DN1 for transmission, DN1 may transmit a packet (frame) with information that enables other devices to transmit in slots assigned for its reception. As illustrated in FIG. 10A, in some cases, the frame may be a Request to Send (RTS) frame.

The frame may include a TRN field that allows other devices to estimate the direction (or antenna weight vector AWV) in which the other neighboring devices receive from DN1. For example, the neighboring devices may use the estimated direction or AWV to adjust transmit antenna settings for transmission during at least one of the one or more time slots provided in the frame.

The information in the frame that enables other devices to avoid interfering with the DN may include, for example, interference-related parameters that allow the neighbor nodes (e.g., S2 and D2) to determine whether their transmissions will (potentially) interfere with the reception in DN1 (e.g., in some cases, interference depends on such parameters). Such parameters regarding interference, for example, may include an interference sensitivity factor (ISF) and an interference level threshold (e.g., a device may decide to transmit if estimated interference level caused by a transmission is less than the threshold level). The ISF may enable the neighboring wireless nodes to estimate a potential level of interference at DN1 due to communication between the neighboring wireless nodes. The interference threshold may enable the neighboring wireless nodes to determine whether their communication, during the one or more time slots, will potentially interfere with reception by the DN1 and/or DN2. In some cases, DN1 may adjust the information (such as the ISF), for example, based on an interference level allowed at DN1 and/or an interference level encountered at DN1. The interference level allowed at the apparatus may depend on, for example, a receiver sensitivity and/or link quality between the DN1 and DN2. In some cases, DN1 (and DN2) may perform transmit power control (TPC) to reduce transmit power when communicating in the DN.

The information may also include a schedule that indicates (e.g., list of start times and lengths) TDD slots assigned for reception by DN1 (e.g., assigned to other DN nodes for transmissions to DN1). For example, the schedule may be a schedule of time slots assigned to the DN1 for reception of simplex communications in the DN via a receive antenna pattern corresponding to an antenna transmit pattern used for transmission of the frame providing the information. In some cases, it may be assumed that for the indicated time slots, the receive antenna for DN1 (or other node transmitting the frame) will have the receive pattern corresponding to the transmit pattern in which the current packet is transmitted (so Tx and Rx antenna reciprocity may be assumed).

The information may be related to receive and transmit antenna gain reciprocity. The information may be related to a transmit power applied to an antenna and a receive and transmit antenna gain reciprocity.

Referring again to FIG. 10A, node receiving the frame (e.g., S2 and/or D2) may train their antennas and estimate the direction ($\theta$ in FIG. 8) from which transmission from DN1 are received using the training (TRN) field of the packet. For this estimation, the assumption may be that the data part of the packet is received in with an antenna configuration in quasi-omni mode.

Figure 10B:
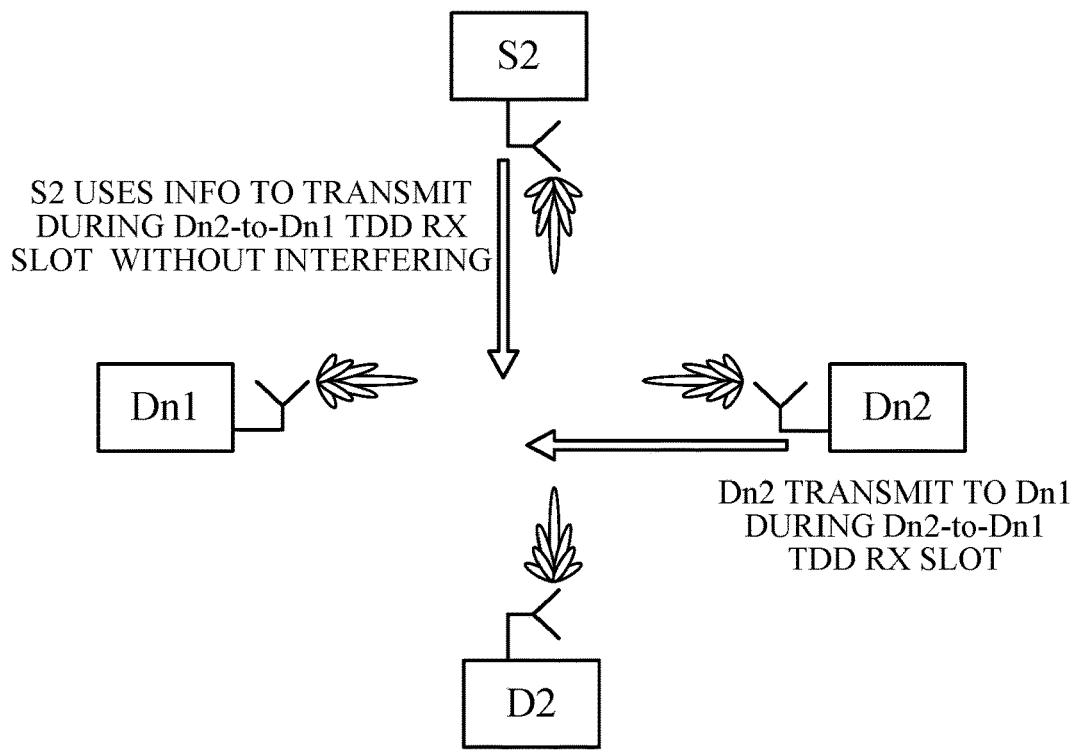

Referring to FIG. 10B, if S2 wants to transmit to D2 without interfering with reception of DN1, S2 can check the level of interference it causes in the direction of Dn1 (e.g., $\varphi$ in FIG. 8) when its sets its antennas to transmit to D2 using information from ISF. If the level of interference (estimated using ISF) is below the threshold TH, S2 may decide to transmit to D2 during the times indicated by the schedule that DN1 published of TDD slots in which DN1 is the destination with the corresponding receive pattern.

As D2 will typically need to respond (e.g., with an ACK or BACK) within these slots, D2 may also perform the same process based on information it received in frames from DN1.

In some cases, the frame (from DN1) may be a clear to send (CTS)-to-Self frame. In such cases, the destination address of that packet/frame may be the address of the STA that is the intended receiver for this TDD slot. In some cases, the ISF, TH and schedule may be transmitted (carried) in a control trailer (CT) of the frame (or some other part of a header of the frame). In some cases, the frame may be a beacon to which a TRN field (or fields) is added. This beacon may also include an extended schedule element.

In some cases, S2 and D2 may exchange information about times in which they can transmit without interfering with DN nodes. In such cases, S2 and D2 may both transmit in a specific slot (in which Dn1 is the destination) if at least one of them received the packet that allowed shared transmission and the second was on receive mode on that time. As noted, in some cases, there may be an inherent assumption of antenna pattern reciprocity on devices participating in the spectrum sharing, for both the DN nodes and the other (neighboring) devices.

The processing from neighboring node S2 may be described as follows. A STA DN1 in the distribution network transmits a packet/frame intended for DN2 (as shown in FIG. 8). This packet may contain a TRN field. S2 receives this packet using quasi-omni mode with a receiver power Pr (omni). S2 may estimate the direction (I) from which it receives this packet using the TRN fields. The terms used in the following equations may have the following meanings:

Pt—transmit power
Gt—transmit gain
Gr—receive gain
Pr—received power
PL—path Loss The receiver power, Pr as measured at S2 may be defined as follows:

$$Pr(Dn1 \rightarrow S2) = Pt(Dn1) + Gt(Dn1, \theta) - PL(Dn1 \rightarrow S2) + Gr(S2, omni)$$

When STA S2 transmits to STA D2, it may estimate the received power at DN1 as:

$$Pr(S2 \rightarrow Dn1) = Pt(S2) + Gt(S2, \phi) - PL(Dn \rightarrow S2) + Gr(Dn1, \theta) =$$
$$Pt(S2) + Gt(S2, \phi) + Pr(Dn1 \rightarrow S2) - Pt(Dn1) -$$
$$Gt(Dn1, \theta) - Gr(S2, omni) + Gr(Dn1, \theta) =$$
$$Pt(S2) + Gt(S2, \phi) + Pr(Dn1 \rightarrow S2) - ISF(\theta) - Gr(S2, omni)$$

In order to keep the level of interference $Pr(S1 \rightarrow Dn1)$ below the threshold interference level TH, which represents the threshold of allowed interference level at Dn1, STA S2 needs to know the following:

$$Pt(S2), Gt(S2,\phi), Gr(S2,omni), Pr(Dn1 \rightarrow S2), ISF(\theta).$$

The first three are internal parameters known to S2 (per the transmit pattern when transmitting to D1). The receive power Pr(Dn1→S2) was measured on the packet that Dn1 transmitted. ISF, as a function θ, can be determined (by DN1) based on the following equation:

$$ISF(\theta)=Pt(Dn1)+Gt(Dn1,\theta)-Gr(Dn1,\theta).$$

Dn1 does not know θ so it transmits a value of ISF:

$$ISF=Pt(Dn1)+\max_\theta(Gt(Dn1,\theta)-Gr(Dn1,\theta))$$

as information in the frame as a part of the packet that allows "interfering transmission." Given ISF, S2 can control the level of interference by changing Pt(S2), or by forming a null (controlling Gt(S2, φ)), for example, by applying attenuation in a specific direction.

Once S2 knows that it can transmit to D2 during the intervals that Dn1 published in the packet that allowed "interfering transmissions". It will not cause interference in Dn1 since the S2 controls the level of interference knowing the following parameters:

$$Pt(S2),Gt(S2,\phi),Gr(S2,omni),Pr(Dn1\rightarrow S2),ISF$$

and by controlling Pt(s2) and Gt(S2, φ).

In some cases, S2 may take one or more actions to (further) reduce the estimated potential level of interference at the first wireless node. For example, in some cases, S2 may perform transmit power control (TPC) when outputting frames for transmission (e.g. to reduce transmit power for communications between S2 and D2). In some cases, S2 may change an antenna configuration (e.g., to change a beamforming configuration reduce the receive power of transmissions from S2/D2 at DN1). In some cases, an antenna configuration may be changed to apply attenuation in a specific direction (e.g., in the direction of DN1 and/or DN2). Changing the antenna configuration may involve changing and/or switching at least one of an antenna module or antenna array.

Figure 6A:
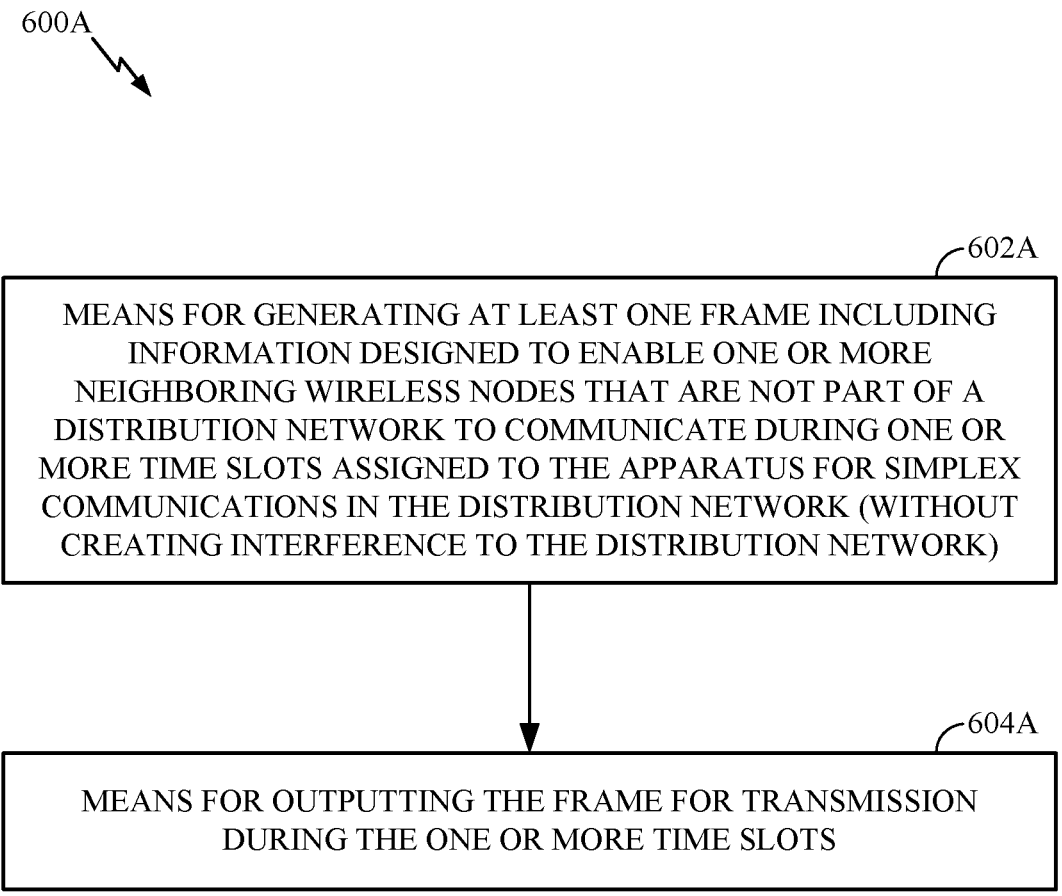
FIG. 6A illustrates example components capable of performing the operations shown in FIG. 6.
Figure 7A:
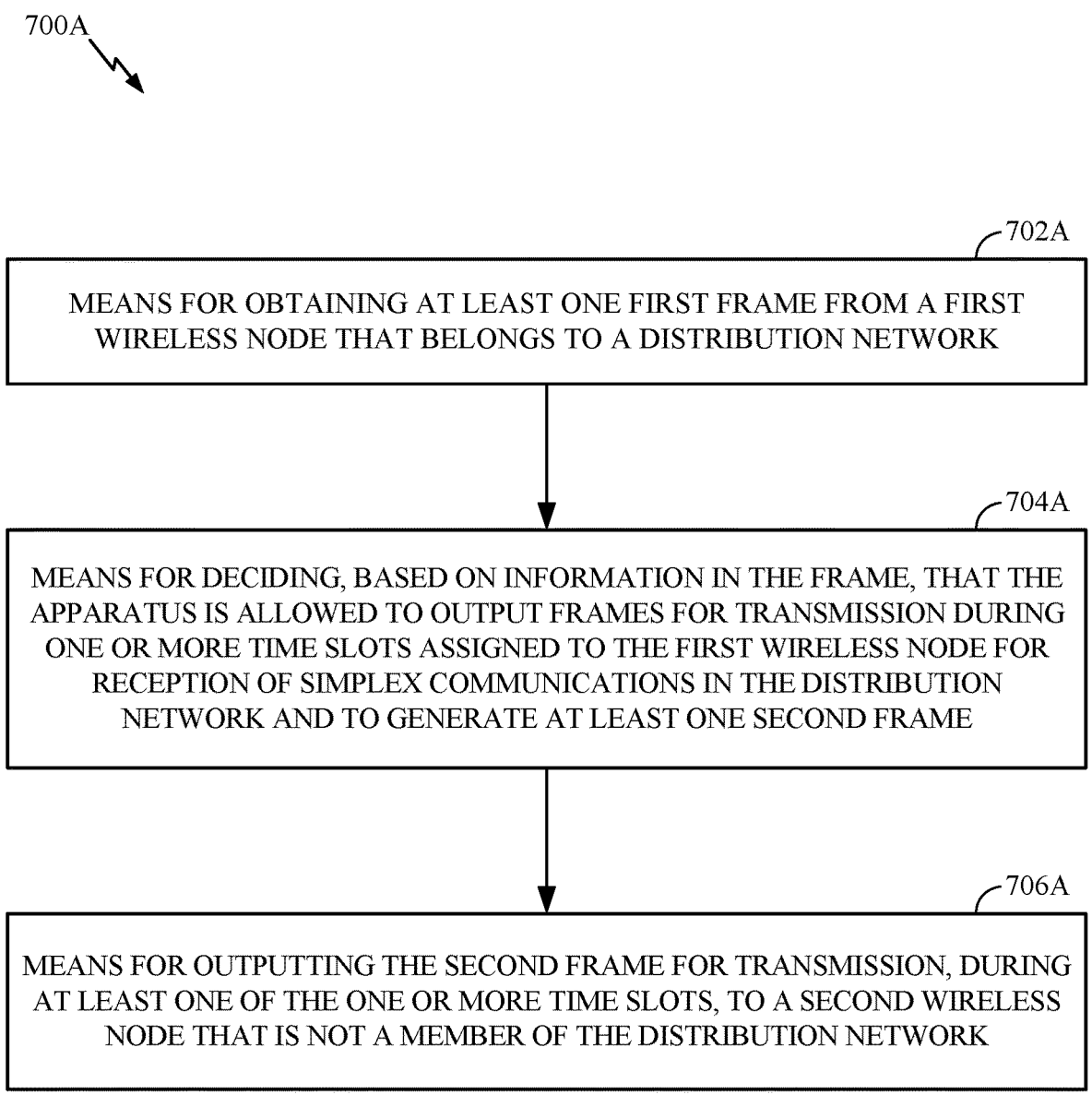
FIG. 7A illustrates example components capable of performing the operations shown in FIG. 7.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, means-plus-function components shown in FIGS. 6A, and 7A correspond to operations shown in FIGS. 6 and 7.

For example, means for obtaining may comprise a receiver (e.g., the receiver unit 222) and/or an antenna(s) 224 of the access point 110 or the receiver unit 254 and/or antenna(s) 252 of the user terminal 120 illustrated in FIG. 2. Means for outputting frames for transmission may comprise a transmitter (or other interface), such as transmitter unit 222 and/or antennas 224 of the access point 110 or the transmitter unit 254 and/or antennas 252 of the user terminal 120 depicted in FIG. 2.

Means for generating, means for deciding (making a decision), means for performing, means for processing, and means for determining may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

In some cases, rather than separate interfaces, a single interface may be used to exchange frames with another device. For example, a single interface may be a transceiver with both transmit and receive functions (or functionality to both output frames for transmission and obtain frames).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a processing system configured to generate at least one frame including information designed to enable one or more neighboring wireless nodes that are not part of a distribution network to communicate during one or more time slots assigned to the apparatus for simplex communications in the distribution network;
    an interface configured to output the at least one frame for transmission during the one or more time slots; and
    wherein the information comprises an interference sensitivity factor (ISF) from which the neighboring wireless nodes are able to estimate a potential level of interference at the apparatus due to communication between the neighboring wireless nodes.

2. The apparatus of claim 1, wherein the information further comprises an interference threshold to enable the neighboring wireless nodes to determine whether their communication, during the one or more time slots, will potentially interfere with reception by the apparatus.

3. The apparatus of claim 1, wherein the at least one frame also comprises one or more training fields designed to allow the neighboring wireless nodes to estimate at least one of a direction or an antenna weight vector (AWV) of reception of the at least one frame.

4. The apparatus of claim 1, wherein the at least one frame comprises at least one of a Request to Send (RTS) frame or a Clear to Send (CTS) frame.

5. The apparatus of claim 1, wherein the information is carried in at least one of a header or a control trailer (CT) of the at least one frame.

6. The apparatus of claim 1, wherein the information is related to receive and transmit antenna gain reciprocity.

7. The apparatus of claim 1, wherein the information is related to a transmit power applied to an antenna and a receive and transmit antenna gain reciprocity.

8. The apparatus of claim 1, wherein the processing system is further configured to adjust the information based at least in part on at least one of an interference level allowed at the apparatus or an interference level encountered at the apparatus.

9. The apparatus of claim 8, wherein the interference level allowed at the apparatus depends on at least one of a receiver sensitivity or link quality between the apparatus and the second wireless node.

10. The apparatus of claim 1, wherein the processing system is further configured to perform transmit power control (TPC) when outputting the at least one frame for transmission.

11. An apparatus for wireless communications, comprising:
    a processing system configured to generate at least one frame including information designed to enable one or more neighboring wireless nodes that are not part of a distribution network to communicate during one or more time slots assigned to the apparatus for simplex communications in the distribution network;
    an interface configured to output the at least one frame for transmission during the one or more time slots; and
    wherein the information comprises a schedule of time slots assigned to the apparatus for reception of simplex communications in the distribution network via a receive antenna pattern corresponding to an antenna transmit pattern used for transmission of the at least one frame.

12. The apparatus of claim 11, wherein the schedule indicates start times and lengths of the time slots assigned to the apparatus for reception of simplex communications in the distribution network.

13. A method for wireless communications by an apparatus, comprising:
    generating at least one frame including information designed to enable one or more neighboring wireless nodes that are not part of a distribution network to communicate during one or more time slots assigned to the apparatus for simplex communications in the distribution network; and
    outputting the frame for transmission during the one or more time slots, and
    wherein the information comprises an interference sensitivity factor (ISF) from which the neighboring wireless nodes are able to estimate a potential level of interference at the apparatus due to communication between the neighboring wireless nodes.

* * * * *